US007820992B2

(12) United States Patent
Yoshida

(10) Patent No.: US 7,820,992 B2
(45) Date of Patent: Oct. 26, 2010

(54) NEUTRON CHOPPER

(75) Inventor: Katsuhiko Yoshida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 152 days.

(21) Appl. No.: 12/179,900

(22) Filed: Jul. 25, 2008

(65) Prior Publication Data

US 2009/0121161 A1 May 14, 2009

(30) Foreign Application Priority Data

Aug. 28, 2007 (JP) ............................ 2007-220648

(51) Int. Cl.

*G02B 5/00* (2006.01)
*G21K 1/00* (2006.01)
*H01J 1/52* (2006.01)
*H01J 3/00* (2006.01)
*H01J 5/18* (2006.01)
*H01J 29/46* (2006.01)

(52) U.S. Cl. ................. 250/505.1; 250/251; 250/390.1; 250/518.1; 318/799; 318/702; 318/807; 378/160

(58) Field of Classification Search .............. 250/505.1, 250/251, 390.1, 518.1; 318/799, 702, 807; 378/160

See application file for complete search history.

(56) References Cited

U.S. PATENT DOCUMENTS 4,996,700 A * 2/1991 Yamashita et al. .......... 378/145

FOREIGN PATENT DOCUMENTS

| | | |
|---|---|---|
| GB | 2164210 A | 3/1986 |
| JP | 50-30559 | 9/1975 |
| JP | 2-156200 | 6/1990 |
| JP | 7-110397 | 4/1995 |

OTHER PUBLICATIONS

Ryuji Ohkubo et al "Development of Neutrons T0 Chopper", 7th High Energy Accelerator Research Organization Mechanical Engineering Workshop Reports, 3 pages, URL: http://ilc.kek.jp/MechWS/2006/.

* cited by examiner

*Primary Examiner*—Jack I Berman
*Assistant Examiner*—Meenakshi S Sahu
(74) *Attorney, Agent, or Firm*—Oblon, Spivak, McClelland, Maier & Neustadt, L.L.P.

(57) ABSTRACT

A neutron chopper according to the present invention includes a housing which internally forms a sealed space, the housing having window portions through which neutrons pass, a fixed shaft which is fixed inside the housing, a rotor which is rotatably supported by the fixed shaft, the rotor provided with a blocking portion which can block neutrons passing through the housing, and a motor which is provided inside the housing for rotating the rotor of the neutron chopper, where a stator of the motor is fixed to the fixed shaft, and a rotor of the motor receives a rotating force from the stator around the fixed shaft, and is fixed to the rotor of the neutron chopper. The neutron chopper is formed with small size, and neutron guides are easily disposed closely, consequently vacuum leak is hardly occurred in the neutron chopper.

2 Claims, 4 Drawing Sheets

NEUTRON CHOPPER

BACKGROUND OF THE INVENTION

1. Field of the Invention

The present invention relates to a neutron chopper used for a neutron scattering experiment device which radiates neutrons on a specimen, and analyzes an internal structure and the like of the specimen based on scattered neutrons.

2. Description of the Related Art

The neutron scattering experiment device radiates neutrons on a specimen, and observes neutrons scattered by the specimen, thereby analyzing physical properties (internal structure) of the specimen. In the neutron scattering experiment device, neutrons generated in a pulse form at a neutron generation source are led to the specimen by a beam transport system designed to transport neutrons at a low loss by means of neutron guides (such as super mirrors). In the course thereof, a time interval of the beam is properly shaped and selected by means of a neutron chopper or the like. The neutrons made incident to the specimen are scattered at a specific angle and at a specific velocity according to an arrangement and a mode of movement of atoms and molecules in the specimen and detected by a neutron detector. The energy of the scattered neutron is determined by measuring the time of flight of the pulsed neutron beam, and is analyzed along with the angular dependency of the scattering intensity, and experiment results are extracted consequently.

In a nuclear spallation neutron source as the neutron generation source, in a moment when protons collide with liquid mercury target, high-speed neutrons are generated, and are transmitted instantly. The observation by means of the neutron scattering experiment device is carried out at a high precision and at a high sensitivity, and, thus, the high-speed neutrons generated at the predetermined interval constitute a background source, resulting in a cause of interference on the observation.

"Development of Neutrons $T_0$ chopper", Ryuji Ohkubo and four other persons, 7th High Energy Accelerator Research Organization Mechanical Engineering Workshop Reports, available on the Internet at URL: http://ilc.kek.jp/MechWS/2006/, discloses a neutron chopper (so-called $T_0$ chopper) as a device which blocks the high-speed neutrons. This neutron chopper includes a rotating body provided with a metal hammer having a mass enough for blocking neutrons having an unnecessarily high energy of several hundreds meV, and a mechanism which rotates the hammer highly precisely in synchronism with the generation of the pulsed neutrons. Specifically, a hammer, which is made of Inconel X-750 (registered trademark), which is a high-Ni material for blocking neutrons, is provided integrally with a rotor in a vacuum container. Then, a power from a motor provided outside the vacuum container is transmitted to the rotor of the neutron chopper via a magnetic seal unit, thereby rotating the rotor and hammer. By blocking a beam line with the hammer only in a neighborhood of the time origin (t=0) at which the high-speed neutrons are generated, the high-speed neutrons are prevented from being transmitted to the downstream of the experiment device. Neutrons required for the analysis experiment are low in energy and are slow in the flight speed, and, thus, reach the neutron chopper later than the high-speed neutrons. Therefore, by adjusting the timing of the rotation of the hammer, it is possible to prevent the hammer from blocking the beam line at the time of the arrival, and it is thus possible to remove only the unnecessary high-speed neutrons constituting a background source without preventing the transport of the necessary neutron beam.

On this occasion, when neutrons pass through the atmosphere, the neutrons collide with molecules of the air, are scattered, and are attenuated, and it is thus necessary to provide neutron guides in front and rear of the neutron chopper as close thereto as possible. However, in the neutron chopper described in "Development of Neutrons $T_0$ chopper", the motor and the mechanism for transmitting the power of the motor are provided outside the housing forming the neutron chopper, resulting in a configuration in which it is hard to arrange the neutron guides close to the housing, which poses a problem.

Moreover, the neutron chopper described in "Development of Neutrons $T_0$ chopper" is configured such that the motor in the atmosphere transmits the power to the hammer in the vacuum, and, thus, tends to generate a vacuum leak, which poses a problem.

Further, this neutron chopper requires a large number of devices such as a magnetic seal unit which restrains the vacuum leak, a coupling which transmits the power from the motor to the hammer, and a timing belt, resulting in an increase in the cost, and an increase in the size of the neutron chopper, which pose a problem.

SUMMARY OF THE INVENTION

It is an object of the present invention to provide a neutron chopper which is configured compact, promotes a close arrangement of neutron guides, and hardly generates a vacuum leak.

The present invention relates to a neutron chopper used for a neutron scattering experiment device which causes neutrons to irradiate a specimen, and analyzes an internal structure and the like of the specimen based on scattered neutrons.

In order to attain the above object, the neutron chopper according to the present invention has the following several features. In other words, the neutron chopper according to the present invention has the following features singly or in combination properly.

To attain the above object, the neutron chopper according to the present invention includes a housing which internally forms a sealed space, where the housing includes window portions through which neutrons pass, a fixed shaft which is fixed inside the housing, a rotor which is rotatably supported by the fixed shaft, a blocking portion which is provided on the rotor, where the blocking portion can block neutrons passing through the housing, and a motor which is provided inside the housing and between the fixed shaft and the rotor, where the motor rotates the rotor.

With this configuration, since the motor which rotates the rotor provided with the blocking portion is disposed inside the housing, a power transmission system from the motor to the rotor is completed inside the housing. As a result, the number of paths which communicate the inside and the outside of the housing is reduced in the housing, resulting in a configuration hardly presenting a vacuum leak. Moreover, since the motor and the mechanism which transmits the power of the motor are not disposed outside the housing, neutron guides disposed in front and rear of the neutron chopper are disposed easily close to the housing of the neutron chopper.

Moreover, the motor is provided between the fixed shaft and the rotor, the drive mechanism is concentrated in a neighborhood of the center of rotation of the rotor. As a result, a space for disposing the drive mechanism is not excessively large, and the drive mechanism and the housing containing the drive mechanism, the rotor, and the like can thus be a compact construction. Consequently, the size of the neutron chopper can be reduced.

Moreover, in the neutron chopper according to the present invention, a stator of the motor may be fixed to the fixed shaft, and a rotor of the motor may receive a rotating force around the fixed shaft from the stator, and may be fixed to the rotor of the neutron chopper.

With this configuration, the stator is stably supported by the fixed shaft, and the rotating force applied to the rotor of the motor directly contributes to the rotation of the rotor of the neutron chopper because of interaction with the stator, resulting in an efficient rotation of the rotor of the neutron chopper.

DESCRIPTION OF THE PREFERRED EMBODIMENTS

A description will now be given to a preferred embodiment of the present invention with reference to the drawings.

Figure 1:
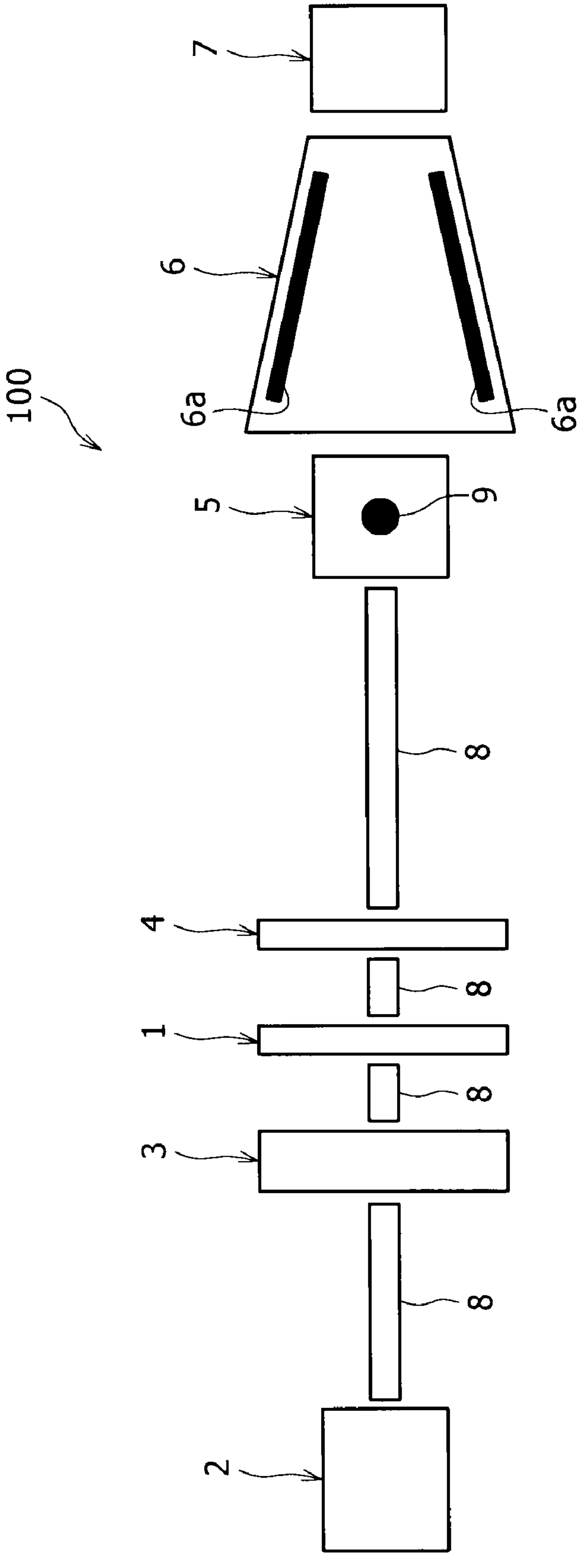
FIG. 1 is a schematic diagram of a spectrometer employing a neutron chopper according to an embodiment of the present invention.

FIG. 1 is a schematic diagram of a spectrometer employing a neutron chopper according to an embodiment of the present invention.

As the neutron chopper according to the present embodiment, a description will be given to a $T_0$ chopper as an example. The $T_0$ chopper 1 is, as shown in FIG. 1, for example, preferably applied to a neutron experiment device 100 used to acquire information on relationships between the atomic arrangement and movements of the atoms and molecules, and physical properties and functions of a specimen 9. The neutron experiment device 100 includes a pulsed neutron generation source 2, a beam shutter 3, the $T_0$ chopper 1, a disk chopper 4, a specimen chamber 5, a vacuum scattering chamber 6, a beam stopper 7, and neutron guides 8.

The pulsed neutron generation source 2 generates pulsed white neutrons (neutron beam). On this occasion, the white neutrons are a group of neutrons having various energies (velocities). In a nuclear spallation neutron source as the pulsed neutron generation source 2, for example, the pulsed neutron beam can be generated by causing a proton beam having a high energy such as 3 GeV, which is made incident at a predetermined repeated cycle such as 25 Hz, to collide a target such as liquid mercury thereby generating the nuclear spallation.

The neutron guides 8 are disposed between the pulsed neutron generation source 2 and the beam shutter 3, between the beam shutter 3 and the $T_0$ chopper 1, between the $T_0$ chopper 1 and the disk chopper 4, between the disk copper 4 and the specimen chamber 5, and the like, in order to lead neutrons in the white neutrons without loss thereof to the respective devices. As the neutron guides 8, guides which are constructed by applying Ni on an inner wall of a guide, and guide neutrons by means of total reflection are employed, for example.

The beam shutter 3 is a shutter which can block the neutrons which are generated by the pulsed neutron generation source 2, and proceed to the specimen chamber 5.

The disk chopper 4 is a neutron chopper for shaping the pulse of the white neutrons or for selecting monochromatic neutrons having a certain energy (velocity) from the white neutrons by rotating a disk having transmitting portions and blocking portions with respect to neutron beam.

The vacuum scattering chamber 6 is disposed after the specimen 9, and includes detectors 6*a* which can detect neutrons made incident to the specimen 9, and then scattered. It is possible to acquire information on relationships between the atomic arrangement and movements of the atoms and molecules, and physical properties and functions of the specimen 9 by analyzing the scattered angles and the velocities of the neutrons detected by the detectors 6*a*.

The $T_0$ chopper 1 is a neutron chopper which, by blocking a beam line of the neutrons only in a neighborhood of the time origin at which high-speed neutrons are generated from the pulsed neutron generation source 2, prevents the high-speed neutrons from being transmitted to the downstream of the experiment device 100 (on the side of the specimen chamber 5).

A detailed description will now be given to the $T_0$ chopper 1.

Figure 2:
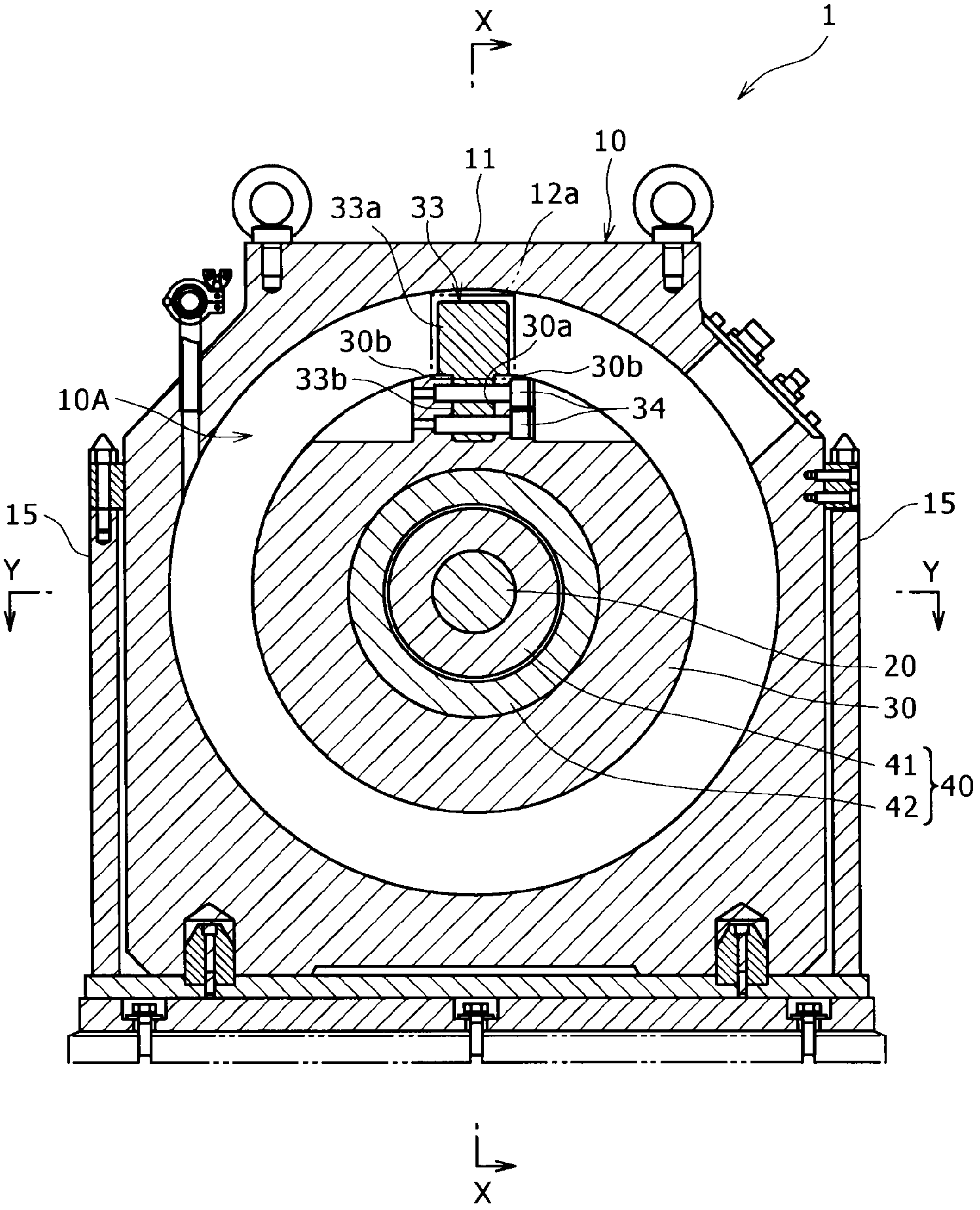
FIG. 2 is a schematic cross sectional view orthogonal to a fixed shaft of a $T_0$ chopper 1 shown in FIG. 1.
Figure 3:
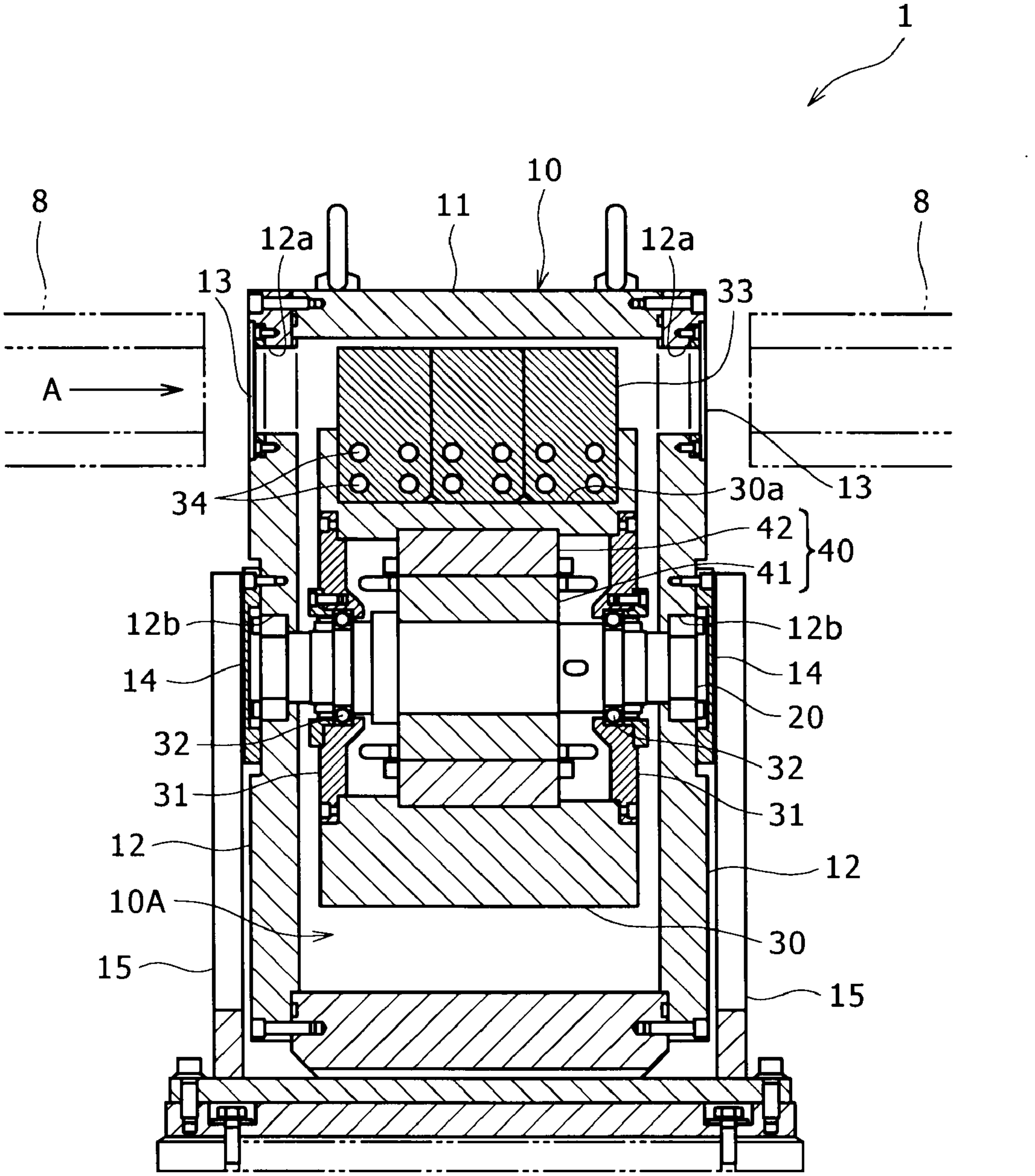
FIG. 3 is a cross sectional view of the $T_0$ chopper 1 shown in FIG. 2 seen from a direction indicated by X-X.

FIG. 2 is a schematic cross sectional view orthogonal to a fixed shaft 20 disposed approximately parallel with the traveling direction of the neutrons in the $T_0$ chopper 1 shown in FIG. 1. FIG. 3 is a cross sectional view of the $T_0$ chopper 1 shown in FIG. 2 seen from a direction indicated by X-X. Moreover, FIG. 4 is a cross sectional view of the $T_0$ chopper 1 shown in FIG. 2 seen from a direction indicated by Y-Y.

Figure 4:
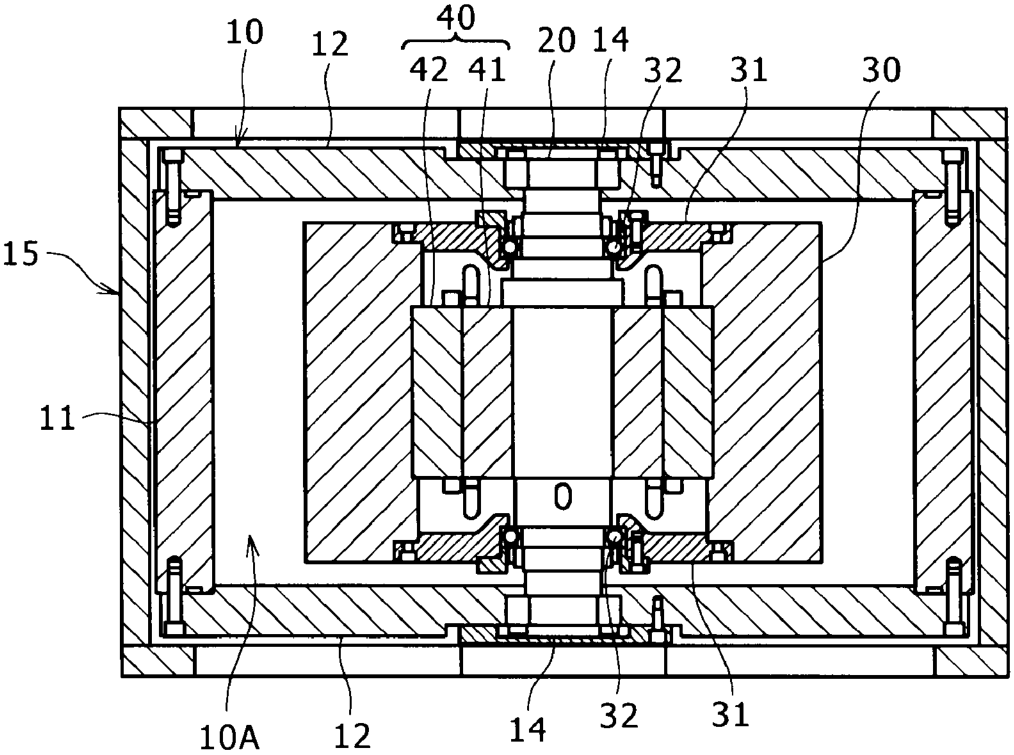
FIG. 4 is a cross sectional view of the $T_0$ chopper 1 shown in FIG. 2 seen from a direction indicated by Y-Y.

As shown in FIGS. 2 to 4, the $T_0$ chopper 1 includes a housing 10, the fixed shaft 20 fixed to the housing 10, a rotor 30 supported rotatably by the fixed shaft 20, and a motor 40 for rotating the rotor 30.

The housing 10 includes a main unit portion 11 including a cylindrical space 10A opening at the front and the rear, and a pair of end face portions 12, 12 provided so as to cover the front and rear of the main unit portion 11. The end face portions 12, 12 are attached to the main unit portion 11 by means of bolts or the like with interposition of an O ring so as to seal the cylindrical space 10A inside the housing 10.

As shown in FIG. 3, a pair of the end face portions 12, 12 include opening portions 12*a*, 12*a* facing each other in a neighborhood of a top end, and thin beam windows (window portions) 13, 13 in a shape of a thin plate are provided so as to cover the opening portions 12*a*, 12*a*. The beam windows 13 are made of aluminum, for example, and neutrons can pass the beam windows 13

The beam windows 13 are attached to the end face portions 12 by means of bolts or the like with interposition of an O ring so as to seal the cylindrical space 10A inside the housing 10.

Moreover, mounting holes 12*b*, 12*b* are formed at positions intersecting a center axis of the cylindrical space 10A on a pair of the end face portions 12, 12, and both ends of the fixed shaft 20 are fixed to the mounting holes 12*b*, 12*b*. It should be noted that the fixed shaft 20 is fixed so as not to rotate relatively to the end face portions 12, 12. Then, cover members 14 are attached so as to cover the mounting holes 12*b* from the outside.

The cover members 14 are attached to the end face portions 12 by means of bolts or the like with interposition of an O ring so as to seal the cylindrical space 10A inside the housing 10.

Around the housing 10, a support frame 15 fixed to the ground is provided. The housing 10 is fixed to the support frame 15 by means of bolts or the like.

The rotor 30 is formed into an approximately cylindrical shape, and is made of an aluminum alloy or the like, for example. As shown in FIGS. 3 and 4, support portions 31, 31 extending toward the center of the cylinder (toward the fixed shaft 20) are fixed by bolts or the like on both ends of this rotor

30 in the axial direction of the cylinder. These support portions 31, 31 are constituted by disk-shape members having a circular space at the center for letting the fixed shaft 20 pass through. Moreover, rolling bearings 32, 32 are interposed between the respective support portions 31, 31 and the fixed shaft 20. In other words, the rotor 30 is rotatably supported by the fixed shaft 20 via the support portions 31, 31 and the rolling bearings 32, 32.

Moreover, on the rotor 30, a groove portion 30*a* which has a depth in the radial direction of the rotor 30, and extends from a neighborhood of one end thereof to a neighborhood of the other end thereof in the axial direction of the cylinder is formed on a portion of an outer peripheral surface thereof. It should be noted that edge portions of the groove portion 30*a* are formed by cutting the outer peripheral surface of the cylindrical rotor 30 stepwise into a pair of projected line portions 30*b*, 30*b* extending linearly in the axial direction of the cylinder and facing each other.

Into the groove portion 30*a*, a hammer 33 (blocking portion) is fit and fixed. The hammer 33 is made of metal having a mass sufficient for blocking the neutrons having an energy equal to or more than several hundreds meV, and is constituted by Inconel X-750, which is a high-Ni material, for example, so as to have a length of approximately 300 mm in the traveling direction of the neutrons (direction indicated by an arrow A in FIG. 3). Though, according to the present embodiment, three hammer blocks are arranged side-by-side in the traveling direction of the neutrons thereby constituting the hammer 33, these hammer blocks may be integrally formed. The hammer 33 includes a head portion 33*a* which has a cross section orthogonal to the traveling direction of the neutrons (refer to FIG. 2) formed into an approximately square, and a body portion 33*b* which extends with narrower width than the head portion 33*a*. The body portion 33*b* of the hammer 33 is inserted into the groove portion 30*a* while the head portion 33*a* is protruded from the outer peripheral surface of the rotor 30, and is fixed to the rotor 30 by a plurality of bolts 34 passing through a pair of the projected line portions 30*b*, 30*b* forming the edge portions of the groove portion 30*a* and the body portion 33*b*.

The hammer 33 is fixed to the rotor 30 such that the head portion 33*a* blocks a path linearly connecting between a pair of the beam windows 13, 13 when the hammer 33 is positioned above the fixed shaft 20 in the vertical direction (in a state shown in FIG. 2) while the rotor 30 is rotating.

The motor 40 is an outer-rotor-type three-phase induction motor constituted by a stator 41 into which windings are fit in order to generate rotating magnetic fields, and a rotor 42 which is provided on the outside of the stator 41 with a predetermined gap therebetween, and is rotated by the rotating magnetic fields around the stator 41. The stator 41 of the motor 40 is fixed by bolts or the like, which are not shown, to a middle portion of the fixed shaft 20 between a pair of the bearings 32, 32 which support the rotor 30. Moreover, the stator 41 is fixed to the fixed shaft 20 such that a rotational center axis of the rotor 42 of the motor 40 is coaxial with the center axis of the fixed shaft 20. Moreover, the rotor 42 of the motor 40 is fixed to an inner peripheral surface of the rotor 30 by bolts or the like, which are not shown. A power supply to the stator 41 of the motor 40 is carried out via power lines provided so as to pass through the fixed shaft 20 in the axial direction or the like, for example.

When the motor 40 is driven, the stator 41 exerts a rotational moment around the fixed shaft 20 on the rotor 42, and the rotor 42 and the rotor 30 fixed to the rotor 42 rotates around the fixed shaft 20.

A description will now be given to an operation of the $T_0$ chopper 1.

A vacuum state of approximately 1 Pa is generated in the housing 10 of the $T_0$ chopper 1, and the drive of the motor 40 rotates the rotor 30 and the hammer 33 around the fixed shaft 20. The rotation speed of the motor 40 is adjusted so as to synchronize with the generation of the pulsed neutrons in the pulsed neutron generation source 2. Then, by adjusting the timing of the rotation such that, when the high-speed neutrons pass the $T_0$ chopper 1, the hammer 33 blocks the path between the beam windows 13, 13, it is possible to prevent these high-speed neutrons from being transmitted to the downstream of the experiment device 100.

As described above, the $T_0$ chopper 1 according to the present embodiment includes the housing 10 which internally forms the sealed space, and includes the beam windows 13, 13 through which the neutrons pass, the fixed shaft 20 which is fixed inside the housing 10, the rotor 30 which is rotatably supported by the fixed shaft 20, and is provided with the hammer 33 which can block the neutrons passing through the housing 10, and the motor 40 which is provided in the housing 10 for rotating the rotor 30, and is provided between the fixed shaft 20 and the rotor 30.

With this configuration, since the motor 40 which rotates the rotor 30 provided with the hammer 33 is disposed inside the housing 10, the power transmission system from the motor 40 to the rotor 30 is completed inside the housing 10. As a result, the number of paths which communicate the inside and the outside of the housing 10 is reduced in the housing 10, resulting in a configuration hardly presenting a vacuum leak.

Moreover, since the motor 40 and the mechanism which transmits the power of the motor 40 are not disposed outside the housing 10, the neutron guides 8 disposed in front and rear of the $T_0$ chopper 1 are easily provided close to the housing 10 of the $T_0$ chopper 1. By the close arrangement of the neutron guides 8, it is possible to reduce the distance of the travel of the neutrons in the air, thereby restraining the neutrons from colliding with molecules of the air, and, then, being scattered and attenuated.

Moreover, the motor 40 is provided between the fixed shaft 20, which is the center of the rotation of the hammer 33, and the rotor 30, the drive mechanism is concentrated in the neighborhood of the center of the rotation of the rotor 30. As a result, the space for disposing the drive mechanism is not excessively large, and the drive mechanism such as the motor 40 and the housing 10 containing the drive mechanism, the rotor 30, and the like can thus be a compact construction. Consequently, the $T_0$ chopper 1 can be compact.

Moreover, since the stator 41 of the motor 40 is fixed to the fixed shaft 20, the stator 41 of the motor 40 is stably supported by the fixed shaft 20. Moreover, since the stator 41 and the fixed shaft 20 are formed substantially integrally, the size of the motor 40 can further be reduced.

Moreover, since there is provided the configuration in which the rotor 42 of the motor 40 receives the rotating force around the fixed shaft 20 from the stator 41 of the motor 40, and is directly fixed to the rotor 30, and the rotating force of the motor 40 is thus directly applied to the rotation of the rotor 30, the rotating force received by the rotor 42 as a result of the interaction with the stator 41 directly contributes to the rotation of the rotor 30. Thus, the rotor 30 can be efficiently rotated. Moreover, since the rotor 30 is rotated by the motor 40, a member for transmitting the rotating force such as a timing belt can be eliminated. In this way, since the drive mechanism is a simple construction, the production cost can be reduced, and since defects and the like hardly occur as a result, it is also possible to reduce the maintenance cost.

Moreover, the hammer 33 serving as the blocking portion which blocks the neutrons, and the rotor 30 are made of the different materials, and only the hammer 33 is made of Inconel X-750, which is the neutron blocking material. As a result, the rotor 30 can be made of a relatively inexpensive material, and it is thus possible to reduce the material cost. The configuration is not limited to the case in which the blocking portion which blocks the neutrons and the rotor may be made of different materials, and the blocking portion and the rotor may be formed integrally. In this case, the mounting members such as bolts are not necessary, and it is thus possible to reduce the number of the components.

Though, a description has been given to the embodiment of the present invention, the present invention is not limited to the above embodiment, and may be embodied in various ways within the scope of the claims. For example, the present invention may be modified and embodied in the following way.

(1) According to the present embodiment, though the $T_0$ chopper 1 including the hammer 33 provided at the one location in the circumferential direction of the rotor 30 is exemplified, the present invention is not limited to this configuration, and may be applied to a $T_0$ chopper including a plurality of hammers are disposed in the circumferential direction of a rotor.

(2) According to the present embodiment, though the $T_0$ chopper 1 includes the hammer 33 as the blocking portion, the present invention is not limited to this configuration, and may be applied to a neutron chopper such as a disk chopper which has a disk component as the blocking portion.

(3) The motor 40 which rotates the rotor 30 is not limited to a three-phase induction motor, and other outer-rotor-type motors in which a rotational moment acts on a rotor of the motor as a result of an interaction between the rotor and a stator of the motor may be properly employed.

(4) The present invention is not limited to the configuration in which the stator 41 is directly fixed to the fixed shaft 20, and may include a configuration in which the stator 41 is attached to the fixed shaft 20 via a housing of the motor 40 or the like. Moreover, the present invention is not limited to the configuration in which the rotor 42 is directly fixed to the rotor 30, and may include a configuration in which the rotation of the motor 40 may be transmitted to the rotor 30 via a reduction gear or the like. Moreover, the present invention is not limited to the configuration in which the windings for generating the rotating magnetic fields are provided on the stator 41, and may include a configuration in which windings are provided on the rotor, and a power is supplied to the rotor via brushes or the like.

I claim:

1. A neutron chopper, comprising:

a housing that internally forms a sealed space, wherein said housing includes a window portion through which neutrons can pass;

a fixed shaft that is fixed inside said housing at both ends of said fixed shaft;

a cylindrical rotor that is rotatably supported by said fixed shaft, wherein said fixed shaft passes through said rotor;

a blocking portion comprising a hammer that is provided on said rotor, wherein said blocking portion can block neutrons passing through said housing; and a motor that is provided inside said housing and between said fixed shaft and said rotor, wherein said motor rotates said rotor, wherein a stator of said motor is fixed to said fixed shaft, and a rotor of said motor receives a rotating force from said stator around said fixed shaft, and said rotor of said motor is fixed to said rotor of the neutron chopper.

2. The neutron chopper according to claim 1, further comprising:

a pair of support portions extending toward the center of said rotor and fixed on both ends of said rotor in the axial direction of said rotor, each of said support portions being constituted by disk-shaped members having a circular space at the center of said disk-shaped members for permitting said fixed shaft to pass therethrough; and rolling bearings interposed between each of said support portions and said fixed shaft, wherein said rotor is rotatably supported by said fixed shaft via said support portions and said rolling bearings.

* * * * *